(12) United States Patent
Newson et al.

(10) Patent No.: US 6,190,077 B1
(45) Date of Patent: Feb. 20, 2001

(54) APPARATUS FOR THE SELECTIVE APPLICATION OF LIQUID MEDIA

(75) Inventors: Richard John Newson, Havelock North; Rex Warren Moore, Whitby; John Philip Fahey, Petone, all of (NZ)

(73) Assignee: Green Management Limited, Petone (NZ)

( * ) Notice: Under 35 U.S.C. 154(b), the term of this patent shall be extended for 0 days.

(21) Appl. No.: 09/405,726

(22) Filed: Sep. 24, 1999

Related U.S. Application Data

(63) Continuation-in-part of application No. PCT/NZ97/00036, filed on Mar. 24, 1997.

(51) Int. Cl.[7] .............................. B05C 17/02; A01C 1/00
(52) U.S. Cl. ........................... 401/192; 47/1.5; 401/205; 401/209; 401/218; 401/219
(58) Field of Search .................................. 401/146, 192, 401/197, 202, 205, 208, 209, 218, 219; 47/1.5

(56) References Cited

U.S. PATENT DOCUMENTS

| | | | |
|---|---|---|---|
| 2,591,530 | * 4/1952 | Findley et al. | 401/197 |
| 2,860,359 | * 11/1958 | James | 401/197 X |
| 2,932,045 | * 4/1960 | Rebelow | 401/218 X |
| 3,076,995 | * 2/1963 | Rabelow | 401/197 |
| 3,257,753 | * 6/1966 | Zennie | 47/1.5 |
| 3,702,739 | * 11/1972 | Rentfrow | 401/197 |
| 4,037,977 | * 7/1977 | Ronai | 401/209 |
| 4,940,350 | * 7/1990 | Kim | 401/209 |

* cited by examiner

Primary Examiner—Henry J. Recla
Assistant Examiner—Kathleen J. Prunner
(74) Attorney, Agent, or Firm—Thomas R. Vigil

(57) ABSTRACT

An applicator for applying liquid media has an applicator head (10) attached to a stem (1). The applicator head (10) includes a spherical applicator freely rotatable on an axle (6) which extends at right angles to the stem (1) that is of a length that an operator can hold the stem (1), and rest the surface of the applicator (10) on the ground. The applicator (10) has a porous resilient envelope (11) which surrounds a sleeve (7) located on the axle (6), a reservoir in the stem (1) charges the porous envelope (11) with liquid media.

8 Claims, 3 Drawing Sheets ically but not exclusively for manual use, that is, the applicator is held by the operator rather than the applicator being attached to and forming part of the apparatus of a
APPARATUS FOR THE SELECTIVE APPLICATION OF LIQUID MEDIA This application is a continuation-in-part application number PCT/NZ97/00036, filed Mar. 24, 1997.

BACKGROUND OF THE INVENTION

1. Field of the Invention

This invention relates to an apparatus for the selective application of liquid media to various surfaces. In particular, but not exclusively, the invention relates to an apparatus that can be utilized to apply liquid chemicals to the foliage of vegetation.

The maintenance of vegetation often includes spraying the foliage with liquid chemicals which may include nutrients, fertilizers, fungicides and the like. The disadvantage with such an operation is that a considerable amount of the chemicals can be lost such as through spray drift and because a spray is generally non-selective, a proportion of the spray will not be applied to the foliage. Consequently, there is a significant wastage with such type of application. Spraying of foliage with chemical herbicides and the like is often used for the control of vegetation and such sprays are extensively used in various areas and applications. There is an increasing concern with the practice of using sprays containing herbicides and other noxious chemicals because of the perceived environmental damage from over spray and from spray drift. It is apparent that other means of applying the chemicals which will minimize such damage would have a general acceptance.

In an endeavor to control over spray and minimize spray drift, various forms of apparatus have been proposed in the past which do not utilize a spray but instead apply a liquid media or a liquidized substance directly to the foliage of vegetation. By this method the actual amount of the liquid or liquidized substance can be more precisely controlled as can the actual application of the liquid or liquidized substance to select vegetation.

2. Description of the Prior Art

One system which is designed to apply a chemical solution to vegetation by direct contact is disclosed in New Zealand Patent Specification 147753. The apparatus described in that specification comprises two cylinders which are mounted in a frame which is attachable to a tractor. The cylinders are covered with a sponge-like material which is kept wet by a chemical solution which is applied to the surface of the cylinders. The cylinders rotate in a manner that as the tractor moves along the ground, the cylinders are held above the ground so that only the surface of the cylinders will touch the foliage of weeds without touching the grass or clover beneath the weeds. The chemical is thereby transferred onto the foliage.

Yet another apparatus for directly applying a chemical solution to foliage is disclosed in New Zealand Patent Specification 231420 which describes an applicator roller supported by a ground wheel. A chemical solution is applied to the surface of the roller and the roller is maintained above the ground by the ground wheel so that as the apparatus moves over the ground, the chemical solution on the surface of the roller is applied to the foliage which is contacted by the roller.

Another form of applicator which is designed more particularly but not exclusively for manual use, that is, the applicator is held by the operator rather than the applicator being attached to and forming part of the apparatus of a tractor or the like, is described in British Specification 1085635. That specification discloses a cylindrical roller which has a porous surface. The roller is mounted for rotation on a pipe which is oriented so that in use the longitudinal axis of the roller will lie substantially parallel to the ground. Holes are formed in the wall of the pipe so that liquid media can be passed into the pipe and through the holes in the pipe to charge the porous surface of the cylinder. To spread the liquid media, the roller is propelled in a manner that the surface of the roller will contact the foliage and transfer the liquid media to the foliage. The specification discloses that as the roller passes over the foliage, the porous surface of the roller will be compressed and after it has passed over the foliage, the porous surface will expand which results in a pumping action which facilitates the transport of the liquid media from the interior of the roller to the outer circumference. The roller as disclosed is also provided with end pieces of a solid material which will act as wheels to prevent excess radial compression of the porous surface of the roller.

Another form of applicator is disclosed in U.S. Pat. No. 3,651,600 which describes a drum which can be a length of plastic pipe, with the drum being covered by an absorbent material which is charged with a herbicide through openings in the wall of the pipe. The ends of the drum are provides with wheels which are of a greater diameter of the drum so as the drum rolls over the ground, the outer surface of the drum will be out of contact with the ground but can still contact the foliage.

A still further form of applicator is disclosed in New Zealand Patent Specification 286054 where the apparatus comprises a rotary applicator which has rotary movement within an applicator head. The apparatus is provided with a reservoir so that chemical solution can flow through a flow resisting means and a wick onto an absorbent surface of the rotary applicator.

It is therefore an object of this invention to provide an improved applicator for dispensing liquid media onto foliage and the like which does not exhibit any of the disadvantages of the prior known systems and which will at least provide the public with a useful choice.

SUMMARY OF THE INVENTION

Accordingly the invention comprises apparatus for applying liquid herbicide to weeds, comprising:

a stem having a lower end with an applicator head mounted on the lower end of the stem and an upper end adapted to be grasped by an operator and of a length that an operator while standing can apply the applicator head to and move the applicator head over weeds on the ground, a ball formed of a resiliently compressible expanded form material forming the applicator head, so that the foam ball can in use hold a quantity of liquid herbicide wetting the foam ball, the foam ball being rotatably mounted on an axle extending across the lower end of the stem of the apparatus and connected at one end of the axle to the stem and having a free other end, the side of the foam ball about the free end of the axle being truncated to form a flat side to the ball, and a reservoir for liquid herbicide in or associated with the stem and a duct from the reservoir which leads liquid herbicide to the applicator head to keep the foam ball wet with herbicide as the applicator is rolled over weeds on the ground.

Preferably in one form the exit end of the duct leads liquid herbicide directly onto the external surface of the foam ball.

Preferably in another form the exit end of the duct leads liquid herbicide to a wick which contacts the foam ball.

Preferably in a further form the apparatus comprises a transfer roller smaller in diameter than the foam ball and having an absorbent outer surface and mounted for rotation about a parallel axis so that the absorbent surface of the transfer roller contacts the surface of the foam ball, and wherein the duct from the reservoir leads liquid herbicide to the surface of the transfer roller.

Preferably in yet another form the duct leads herbicide to a hollow port extending within the axle with holes through the axle from the port to the interior of the foam ball.

Preferably the duct includes means to restrict the flow of liquid media through the duct.

BRIEF DESCRIPTION OF THE DRAWINGS

Preferred forms of the invention will now be described with the aid of the accompanying drawings wherein.

DESCRIPTION OF THE PREFERRED EMBODIMENTS

Figure 1:
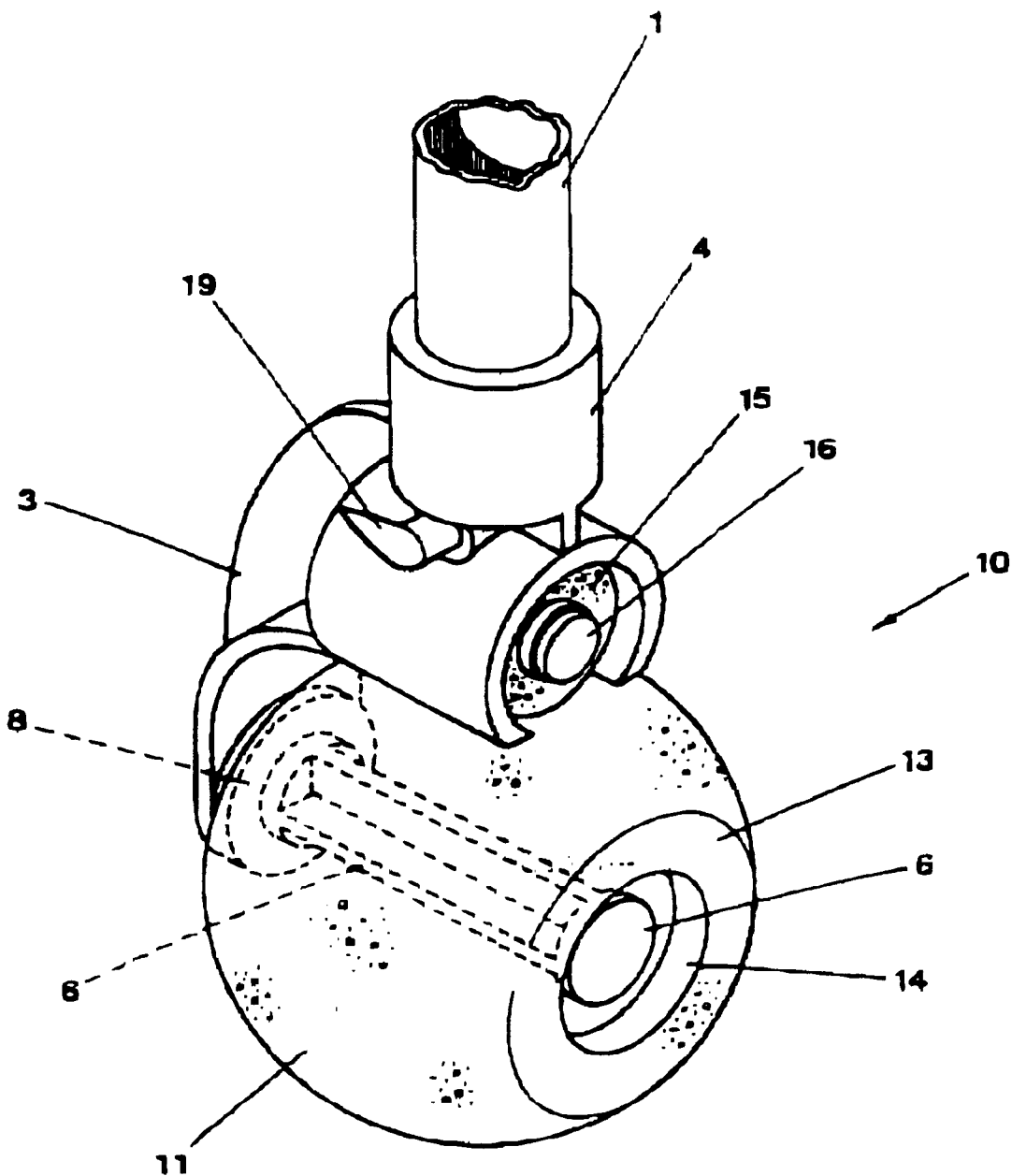
FIG. 1 is a perspective view of one form of the invention.
Figure 2:
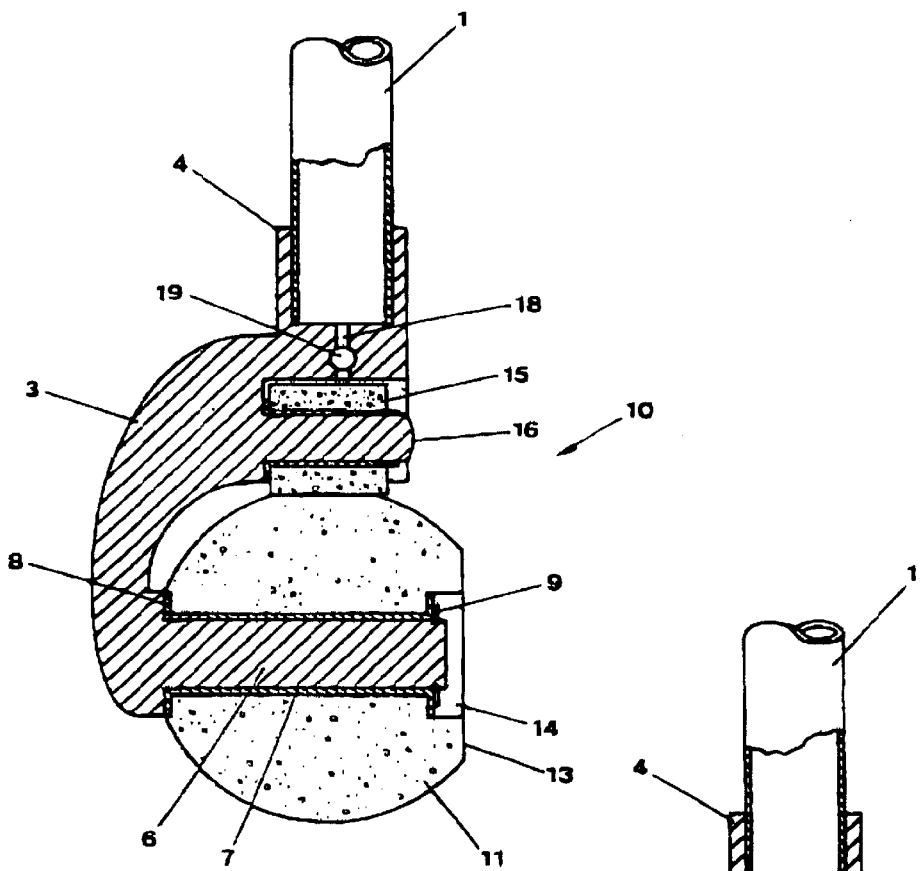
FIG. 2 is a side view, partly in section, of the form of the invention depicted in FIG. 1.
Figure 3:
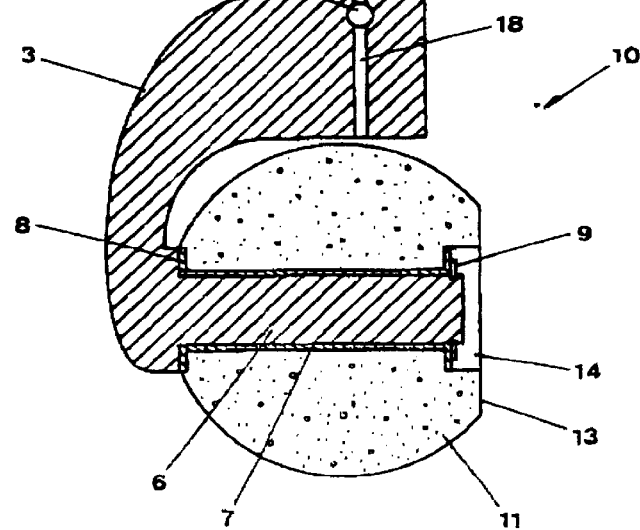
FIG. 3 is a side view similar to that of FIG. 2 but of another form of the invention.
Figure 4:
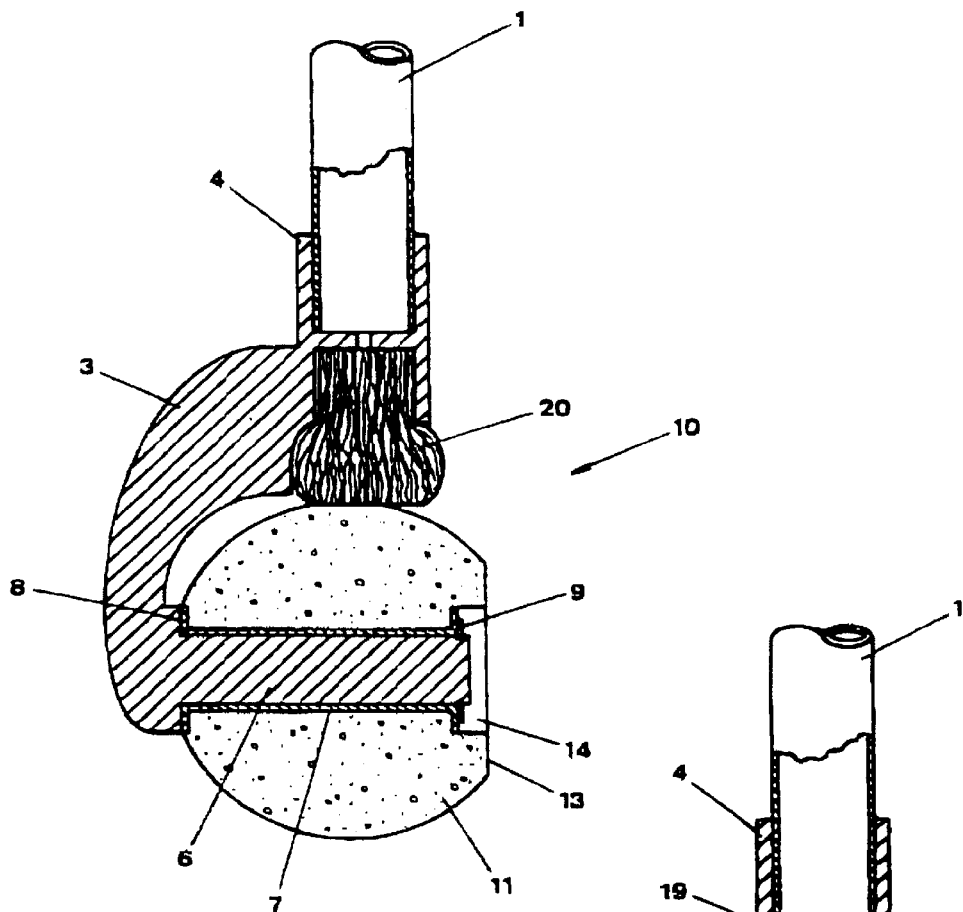
FIG. 4 is a side view similar to that of FIG. 2, of yet another form of the invention.
Figure 5:
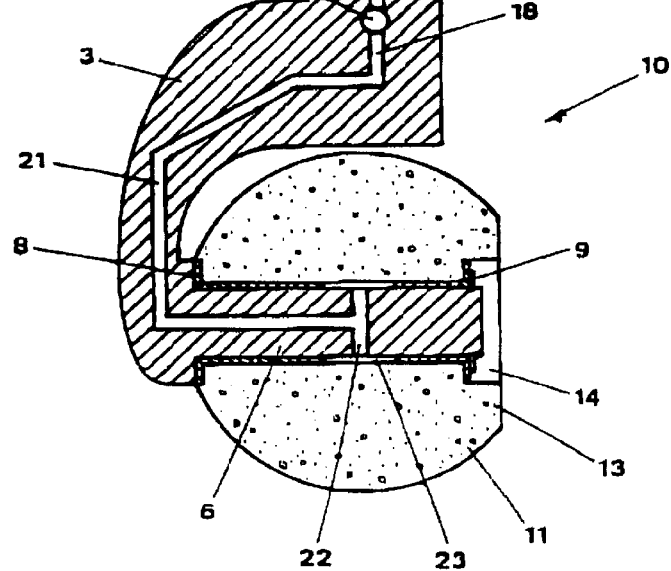
FIG. 5 is a side view similar to that of FIG. 2, of a still further form of the invention.

A typical applicator which incorporates the teachings of one form of the present invention is depicted in FIGS. 1 and 2. As shown in these drawings, the applicator has a stem 1 which is preferably hollow. The stem has an upper end (not shown in the drawings) that is closable such as by a removable cap. An adjustable air valve can be included with the cap or with the upper end of the stem to allow air to enter into the hollow interior of the stem. The lower end of the stem is connected to an applicator head 10.

The interior of the stem 1 will form a reservoir for the liquid media to be dispensed, which is loaded into the reservoir by removing the cap and pouring the liquid media into the reservoir. The stem is preferably formed from a transparent or translucent material so the amount of liquid within the reservoir can be readily ascertained. While in the highly preferred form, the stem is utilized to form a reservoir, it will be understood the reservoir can be separate from the stem and may comprise, for instance, a tank or the like.

The stem 1 is a length that an operator can grasp the stem while standing and rest the applicator head 10 on the ground and it will be understood that the length of the stem will be varied to suit particular requirements. The stem is connected to the applicator head 10 by a suitable mechanical connection which, as indicated in the drawing, may comprise a head member 3, one portion of which is formed into a socket 4 to receive the lower end of the stem 1. The head member 3 is secured to or forms part of an arm which supports an axle 6 which extends substantially perpendicular to the longitudinal axis of the stem 1. The axle 6 may be tubular, solid, round, or of a cruciform shape as indicated in FIG. 1 so as to provide a series of radial flanges onto which the bore of a sleeve 7 can be located to retain the sleeve in the desired position on the axle 6. Preferably the sleeve 7 includes end flanges 8 and the sleeve is retained on the axle by means of a circlip 9. Other means of retaining the sleeve on the axle 6 so it can freely rotate on the axle can be utilized as will be apparent.

The applicator head 10 includes the sleeve 7 and an absorbent envelope 11 which is preferably formed from an open celled elastomeric substance and as illustrated is in the shape of a sphere with one truncated side. The outer edge of the absorbent envelope 11 is preferably truncated as illustrated at 13 and extends axially beyond the outer end of the axle 6. The truncating of the absorbent envelope 11 will allow the applicator to be used close to walls and the like as will be further explained later. As can be seen from the drawing, the truncated end 13 of the absorbent envelope 11 also includes a rebated portion 14 surrounding the circlip 9 to minimize the likelihood of the end of the axle contacting a wall or the like.

The elastomeric substance which forms the absorbent envelope 11 is compressible and also resilient. The particular substance is preferably chosen so that when the applicator is moved over the ground, as is further explained later, the surface of the absorbent envelope where it contacts the ground will be depressed in the area of contact and as it leaves that area will tend to rapidly expand back to its original shape. The effect of this is to provide a dynamic surface to the absorbent surface so the alternating compression and expansion of the absorbent surface will tend to fling off the surface of the applicator, any debris that may have attached itself to the absorbent surface. The elastomeric substance is also open celled, so liquid media can permeate through all of the absorbent surface and form an additional reservoir for liquid media which will also migrate to the surface of the applicator so the surface will be dampened by the liquid media held by the absorbent envelope of the applicator. The alternating compression and expansion of the absorbent envelope 11 will also provide a form of pumping action to assist in the dispersal of the liquid media through the absorbent envelope 11.

Liquid media held within the reservoir formed by the stem 1 can be transferred to the absorbent envelope by various methods. A highly preferred method is illustrated in FIGS. 1 and 2 and in this form, liquid media within the reservoir of the stem 1 is transferred to the applicator 10 by means of a duct 18 which is formed in the head 3 and which communicates with the interior of the stem 1 and terminates at or about the peripheral surface of a transfer roller 15. Preferably an adjustable valve 19 acts in conjunction with the duct 18 so flow of liquid media from the reservoir to the surface of the transfer roller 15 can be controlled. The transfer roller 15 is suitably retained on an axle 16 so it can have rotary movement on the axle which projects from the head 3 with the axle 16 and the axle 6 being preferably parallel as indicated. The transfer roller 15 is covered with a pliable open celled elastomeric substance so it can be charged with liquid media transferred from the reservoir of the stem 1 by the duct 18. The diameter of the transfer roller 15 is such that at least a portion of the peripheral surface of the transfer roller will contact at least a portion of the surface of the absorbent envelope 11. The transfer roller 15 can be formed of a similar material as that of the absorbent envelope 11 or it can be formed at any other form of suitable open-celled elastomeric substance.

To utilize the applicator, the reservoir in the stem 1 is charged with the liquid media to be applied. The valve 19 is adjusted to enable the desired amount of liquid to pass through the duct 18 and be transferred onto the transfer roller 15. The liquid media will then tend to flow through the open celled structure of the transfer roller onto the surface of the applicator and so charge the elastomeric substance of the applicator with liquid media. The device is then held so the peripheral surface of the applicator 10 will contact the ground or the vegetation to which the liquid media is to be applied. The applicator can then be rolled over the ground or the vegetation. As the applicator rotates, the moistened surface of the absorbent envelope will transfer the liquid media to the surface touched by the applicator. The rotation of the applicator will also cause the transfer roller 15 to rotate and consequently liquid media will continue to pass from the reservoir of the stem to maintain the charge of the liquid media within the absorbent envelope.

FIG. 3 illustrates a modification of the present invention, whereby the transfer roller 15 and its associated parts are dispensed with and instead liquid media can pass through the duct 18 which is controlled by the valve 19 and can drip directly onto the surface of the absorbent envelope 11 where it will be absorbed and dispersed through the absorbent envelope.

FIG. 4 illustrates yet another modification of the invention and in this form a wick 20 is located within the head 3 and the duct 18 communicates with the wick so liquid media can pass through the duct into the wick 20. The wick is formed of an appropriate substance so the liquid media can permeate through the wick which as illustrated in the drawing is in contact with the surface of the absorbent envelope and liquid media within the wick will therefore be transferred into the absorbent envelope.

FIG. 5 illustrates yet another form of the invention. In this modification liquid media is transferred to the applicator by means of an extension 21 of the duct 18. The extension terminates in a port or ports 22 within the axle 6. A suitable hole or holes 23 are formed in the sleeve 7 to allow liquid media to pass from the interior of the stem 1, through the ducts 18 and 21, the ports 22 and the holes 23 in the sleeve 7 directly into the interior of the absorbent envelope to charge the applicator with the liquid media.

Having disclosed preferred forms of the invention, it will be apparent to those skilled in the art that various modifications and amendments can be made to the specific embodiments and yet still come within the broad concept of the invention. All such modifications and amendments are intended to be included within the scope of the present invention as defined in the appended claims.

We claim:

1. An apparatus for applying liquid herbicide to weeds, comprising:

a stem having a lower end with an applicator head mounted on the lower end of the stem and an upper end adapted to be grasped by an operator and of a length that an operator while standing can apply the applicator head to and move the applicator head over weeds on the ground, a ball formed of a resiliently compressible expanded foam material forming said applicator head, so that said foam ball can in use hold a quantity of liquid herbicide wetting said foam ball, said foam ball being rotatably mounted on an axle extending across the lower end of the stem of the apparatus and connected at one end of the axle to the stem and having a free other end, the side of the foam ball about the free end of the axle being truncated to form a flat side to the ball, and a reservoir for liquid herbicide in or associated with the stem and a duct from said reservoir which leads liquid herbicide to the applicator head to keep the foam ball wet with herbicide as the applicator head is rolled over weeds on the ground.

2. Apparatus according to claim 1 wherein the foam ball is truncated beyond said free end of the axle to form said flat side to the foam ball.

3. Apparatus according to claim 1 wherein the stem has a hollow interior which forms said reservoir, with a filler port at the top of the stem closed by a cap by which the reservoir may be recharged with liquid herbicide.

4. Apparatus according to claim 3 wherein at least a portion of the stem is transparent to enable the level of liquid herbicide in the reservoir to be seen.

5. Apparatus according to claim 1 wherein the exit end of said duct leads liquid herbicide directly onto the external surface of the foam ball.

6. Apparatus according to claim 1 wherein the exit end of said duct leads liquid herbicide to a wick which contacts the foam ball.

7. Apparatus according to claim 1 comprising a transfer roller smaller in diameter than the foam ball and having an absorbent outer surface and mounted for rotation about a parallel axis so that the absorbent surface of the transfer roller contacts the surface of the foam ball, and wherein said duct from the reservoir leads liquid herbicide to the surface of the transfer roller.

8. Apparatus according to claim 1 wherein the duct leads herbicide to a hollow port extending within said axle with holes through the axle from the port to the interior of the foam ball.

* * * * *